United States Patent
Byagowi et al.

(10) Patent No.: US 12,401,492 B1
(45) Date of Patent: Aug. 26, 2025

(54) NETWORK CLOCK SYNCHRONIZATION WITH QUANTUM SYSTEMS IN AN ENTANGLED STATE

(71) Applicant: Meta Platforms, Inc., Menlo Park, CA (US)

(72) Inventors: Ahmad Byagowi, Menlo Park, CA (US); Hans-Juergen Schmidtke, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 375 days.

(21) Appl. No.: 18/114,592

(22) Filed: Feb. 27, 2023

Related U.S. Application Data (60) Provisional application No. 63/314,599, filed on Feb. 28, 2022.

(51) Int. Cl.
*G06N 10/00* (2022.01)
*G06N 10/40* (2022.01)
*H04L 7/00* (2006.01)
*H04L 7/04* (2006.01)

(52) U.S. Cl.
CPC ............... *H04L 7/04* (2013.01); *G06N 10/40* (2022.01); *H04L 7/0016* (2013.01)

(58) Field of Classification Search
None
See application file for complete search history.

(56) References Cited

U.S. PATENT DOCUMENTS

| | | | | |
|---|---|---|---|---|
| 2017/0357061 | A1* | 12/2017 | Shields | H04L 9/0852 |
| 2018/0173825 | A1* | 6/2018 | Ventroux | G06F 9/46 |
| 2022/0166617 | A1* | 5/2022 | Lamas-Linares | H04B 10/50 |

FOREIGN PATENT DOCUMENTS

| | | | | |
|---|---|---|---|---|
| CN | 112491780 A | * | 3/2021 | G06N 10/00 |

\* cited by examiner

*Primary Examiner* — Brandon M Renner
(74) *Attorney, Agent, or Firm* — Eversheds Sutherland (US) LLP (57) ABSTRACT

A clock synchronization method is disclosed. The method comprises receiving master timing synchronization data from a master clock device, wherein the master timing synchronization data is based at least in part on quantum data obtained from a first quantum device of the master clock device. The method comprises determining local timing synchronization data that is based at least in part on local quantum data obtained from a second local quantum device, wherein the second local quantum device is entangled with the first quantum device such that the local quantum data and the quantum data obtained from the first quantum device are identical at a same time. The method comprises using the determined local timing synchronization data and the received master timing synchronization data to determine a timing correction factor. The method comprises correcting a local system time using the timing correction factor.

20 Claims, 4 Drawing Sheets

NETWORK CLOCK SYNCHRONIZATION WITH QUANTUM SYSTEMS IN AN ENTANGLED STATE

CROSS REFERENCE TO OTHER APPLICATIONS

This application claims priority to U.S. Provisional Patent Application No. 63/314,599 entitled NETWORK CLOCK SYNCHRONIZATION WITH QUANTUM SYSTEMS IN AN ENTANGLED STATE filed Feb. 28, 2022 which is incorporated herein by reference for all purposes.

BACKGROUND OF THE DISCLOSURE

A network interface controller (NIC) is a computer hardware component that connects a computer to a computer network. NICs may also be referred to as network interface cards, network adapters, local area network (LAN) adapters, physical network interfaces, or other similar terms. NICs implement the electronic circuitry needed to communicate among computers in a network (e.g., a LAN). Computers in a network can be synchronized by synchronizing the NICs of the computers. Synchronization may be required to synchronize financial transactions, mobile phone tower transmissions, and other operations in networks that require precise timing. It would be beneficial to develop techniques directed toward improved performance of computer network synchronization.

BRIEF DESCRIPTION OF THE DRAWINGS

Various embodiments of the disclosure are disclosed in the following detailed description and the accompanying drawings.

DETAILED DESCRIPTION

The disclosure can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the disclosure may take, may be referred to as techniques. In general, the order of the steps of disclosed processes may be altered within the scope of the disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the disclosure is provided below along with accompanying figures that illustrate the principles of the disclosure. The disclosure is described in connection with such embodiments, but the disclosure is not limited to any embodiment. The scope of the disclosure is limited only by the claims and the disclosure encompasses numerous alternatives, modifications and equivalents. Numerous specific details are set forth in the following description in order to provide a thorough understanding of the disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured.

Traditionally, network synchronization protocols may be used to synchronize the clocks of different computer systems throughout a computer network. For example, the Network Time Protocol (NTP) is a networking protocol for clock synchronization between computer systems over packet-switched, variable-latency data networks. NTP is intended to synchronize all participating computers to within a few milliseconds of Coordinated Universal Time (UTC). NTP can usually maintain time to within tens of milliseconds over the public Internet, and can achieve better than one millisecond accuracy in local area networks under ideal conditions. However, asymmetric routes and network congestion can cause errors of 100 milliseconds or more. The Precision Time Protocol (PTP) is another protocol used to synchronize clocks throughout a computer network. PTP has a higher accuracy than NTP. On a local area network, it may achieve clock accuracy in the sub-microsecond range.

However, traditional clock synchronization techniques rely on mechanisms that are based on compensating errors. One problem is that errors accumulate over time and the time on a computer system in the network can be consistently running behind. In addition, many issues, including those in network security, online computer games, and online stock trading, may only be mitigated by having more accurate clock synchronization within the network. Furthermore, with traditional clock synchronization techniques, large scale encryption in data centers is nearly impossible. Therefore, improved techniques for network clock synchronization would be desirable.

A non-master clock system is disclosed. The system comprises a communication interface configured to receive master timing synchronization data from a master clock device, wherein the master timing synchronization data is based at least in part on quantum data obtained from a first quantum device of the master clock device. The system comprises one or more processors configured to determine local timing synchronization data that is based at least in part on local quantum data obtained from a second local quantum device, wherein the second local quantum device is entangled with the first quantum device such that the local quantum data and the quantum data obtained from the first quantum device are identical at a same time. The one or more processors are configured to use the determined local timing synchronization data and the received master timing synchronization data to determine a timing correction factor. The one or more processors are configured to correct a local system time using the timing correction factor.

A master clock system is disclosed. The system comprises one or more processors configured to determine master timing synchronization data that is based at least in part on quantum data obtained from a first quantum device, wherein the first quantum device is entangled with a second quantum device of a non-master clock device such that the quantum data obtained from the first quantum device and quantum data obtained from the second quantum device are identical at a same time. The system comprises a communication interface configured to send the master timing synchronization data to the non-master clock device. The non-master clock device is configured to determine non-master timing synchronization data that is based at least in part on the quantum data obtained from the second quantum device. The non-master clock device is configured to use the determined non-master timing synchronization data and the master timing synchronization data to determine a timing correction factor. The non-master clock device is configured to correct a system time of the non-master clock device using the timing correction factor.

A clock synchronization method is disclosed. The method comprises receiving master timing synchronization data from a master clock device, wherein the master timing synchronization data is based at least in part on quantum data obtained from a first quantum device of the master clock device. The method comprises determining local timing synchronization data that is based at least in part on local quantum data obtained from a second local quantum device, wherein the second local quantum device is entangled with the first quantum device such that the local quantum data and the quantum data obtained from the first quantum device are identical at a same time. The method comprises using the determined local timing synchronization data and the received master timing synchronization data to determine a timing correction factor. The method comprises correcting a local system time using the timing correction factor.

In some embodiments, the improved clock synchronization techniques disclosed herein may be used to provide a fine calibration of the clocks within a network. For example, in some embodiments, during a first stage, a traditional technique for synchronizing clocks throughout a computer network may be used to provide a coarse calibration that achieves a first level of clock accuracy within the network. During a second stage, the synchronization of the clocks is then further fine-tuned using the present improved techniques to achieve an improved level of clock accuracy. For example, the Network Time Protocol (NTP) and the Precision Time Protocol (PTP) may be used to synchronize the clocks throughout a computer network to achieve a first level of clock accuracy within the network.

Figure 1:
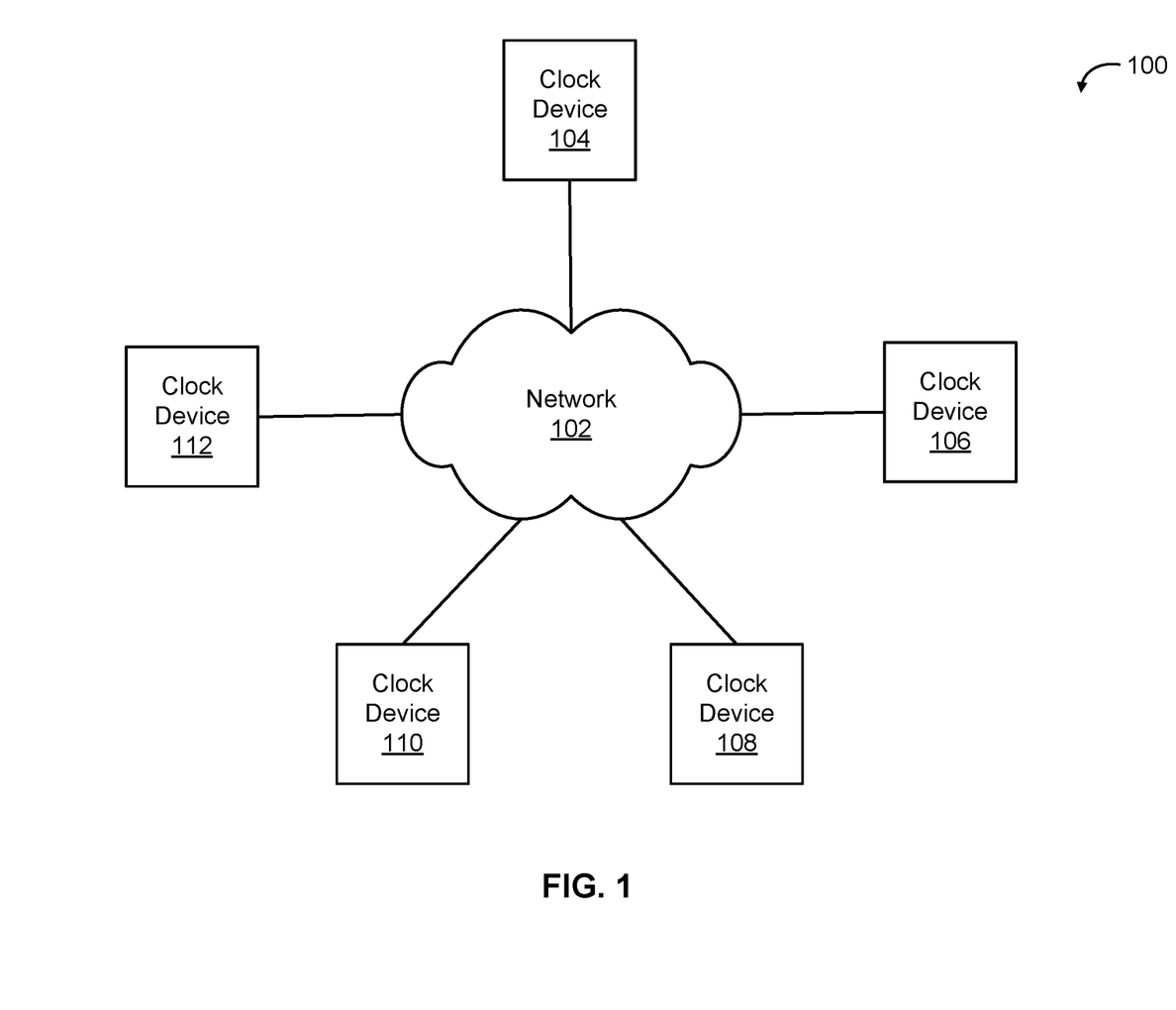
FIG. 1 is a diagram illustrating an embodiment of a network of clock devices.

FIG. 1 is a diagram illustrating an embodiment of a network of clock devices. In system 100, clock devices 104, 106, 108, 110, and 112 are communicatively connected to one another through network 102. The number of clock devices shown is merely illustrative. It is possible for there to be fewer or more clock devices in system 100. In some embodiments, network 102 is a LAN. Other examples of network 102 include one or more of the following: a direct or indirect physical communication connection, mobile communication network, Internet, intranet, Wide Area Network, Storage Area Network, and any other form of connecting two or more systems, components, or storage devices together. In some embodiments, the clock devices are NICs. For example, physical hardware clocks (PHCs) located on NICs may be utilized to keep time. In various embodiments, a PHC generates internal hardware clock values corresponding to the time kept by the PHC. In some embodiments, internal hardware clocks utilize 80-bit counters (80 binary digits), of which 48 bits measure sub-second time. In various embodiments, the NICs are parts of computers connected to network 102. In some embodiments, one of the clock devices is a NIC that incorporates or is communicatively connected to an atomic clock.

In various embodiments, the clocks in system 100 exhibit timing errors that are remedied by the clock synchronization techniques disclosed herein. In some embodiments, one of the clocks serves as a master clock against which other clocks are synchronized. This master clock may be referred to as a grandmaster, time provider, or another similar term. The grandmaster may be a clock that is of higher quality and more accurate than the other clocks, such as an atomic clock. The grandmaster may be selected based on a master clock selection algorithm (e.g., best master clock algorithm). Clocks other than the grandmaster can be ordinary clocks (non-grandmaster clocks with a single network connection, also referred to as slaves), boundary clocks (clocks with multiple network connections that can synchronize one network segment to another), or transparent clocks (clocks that modify messages passing through and can measure and adjust for network delays).

The clock devices in system 100 may be communicatively connected in a variety of different topologies. The types of clock devices in system 100 may also vary. Timing errors can vary depending on the specific topology and types of devices. The performance of a network synchronization protocol (e.g., how long synchronization takes to complete) can also vary depending on the specific topology and types of devices.

The improved clock synchronization techniques for synchronizing a master clock device and a slave clock device are based at least in part on quantum entanglement. Quantum entanglement is a physical phenomenon that occurs when a group of particles is generated, interacts, or shares spatial proximity in a way such that the quantum state of each particle of the group cannot be described independently of the state of the others, including when the particles are separated by a large distance. An entangled system is defined to be one whose quantum state cannot be factored as a product of states of its local constituents. They are not individual particles but are an inseparable whole. In entanglement, one constituent cannot be fully described without considering the other(s). The state of a composite system is always expressible as a sum, or superposition, of products of states of local constituents; it is entangled if this sum cannot be written as a single product term.

In quantum computing, a qubit or quantum bit is a basic unit of quantum information. Quantum entanglement is a nonlocal property of two or more qubits that allows a set of qubits to express higher correlation than is possible in classical systems. When two entangled qubits are in an equal superposition, there is no way to tell if the first qubit has a value of "0" or "1," and likewise for the second qubit. Suppose that the two entangled qubits are separated, with one given to a first device and the other given to a second device. When the first device makes a measurement of its qubit, obtaining—with equal probabilities—either |0) or |1), i.e., it can now tell if its qubit has a value of "0" or "1," because of the qubits' entanglement, the second device must now get exactly the same measurement as the first device. For example, if the first device measures a |0), the second device must measure the same, as |00) is the only state where the first device's qubit is a |0). In short, for these two entangled qubits, whatever the first device measures, so would the second device, with perfect correlation.

In some embodiments, the improved clock synchronization techniques for synchronizing a master clock device and a slave clock device are based at least in part on Quantum Key Distribution (QKD) that is based on entangled quantum mechanical effects. The master clock device and the slave clock device form a pair of quantum systems in an entangled state, and the entanglement enables the improved techniques to exactly synchronize the master clock device and the slave clock device in time. Quantum Key Distribution is a secure communication method which implements a cryptographic protocol involving components of quantum mechanics. QKD enables two parties to produce a shared random secret key known only to them, which can then be used to encrypt and decrypt messages. In QKD, information about the key may be sent via photons that have been randomly polarized. This restricts the photon so that it vibrates in only one plane, e.g., up and down, or left to right. The recipient can use polarized filters to decipher the key and then use a chosen algorithm to securely encrypt a message. The secret data may be sent over normal communication channels, but no one can decode the message unless they have the exact quantum key. This is because "reading" the polarized photons will always change states, and any attempt at eavesdropping will alert the communicators that there has been a security breach.

The quantum entanglement clock synchronization techniques may be employed inside a datacenter between the datacenter racks and between the computer nodes to generate the exact timing of the computer nodes. The improved techniques are based on quantum mechanical effects that can generate nearly perfect noise generation for key distribution.

The quantum entanglement clock synchronization techniques have many benefits. For example, it is virtually impossible to decrypt the communication between the synchronized systems, as the combination of having two exact clocks and using a quantum mechanical mechanism to distribute the key will enable exact distribution of the key based on the time of flight and the time of arrival. In addition, quantum mechanical effects may generate a nearly ideal 50% probability (i.e., random) noise generation that will enable an encryption of the forwarding path of the data with a changed key at a certain frequency. In addition, by having exact time synchronization distributed, the one-way delay/latency can be used to exactly measure the traversed time for a communication. This can be used as a validation mechanism for a communication to detect and reject a middle-man-attack. Such a system is virtually impossible to break since any intervention in the communication channel will alter the traversed time for the transaction.

Figure 2:
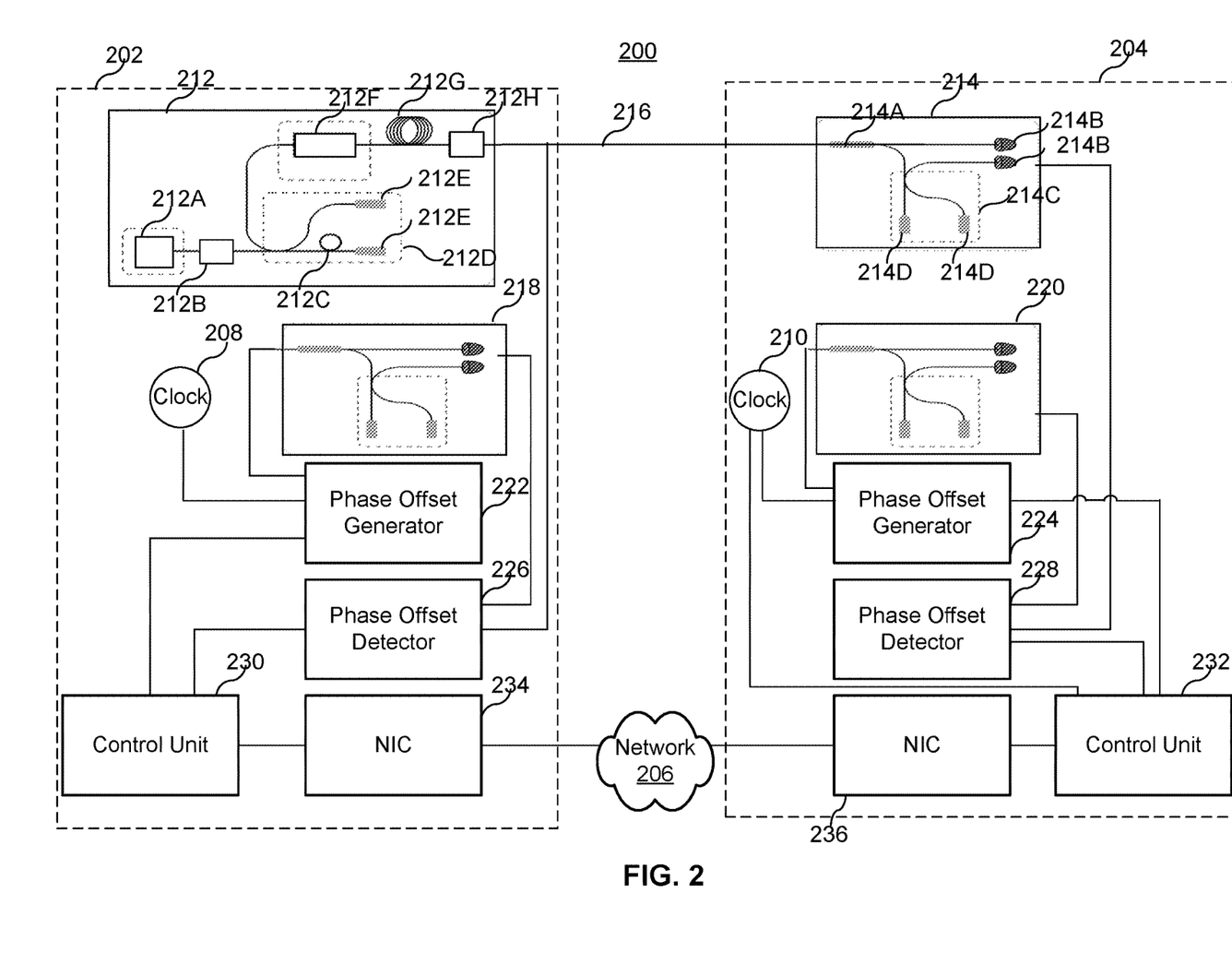
FIG. 2 illustrates an embodiment of a network clock synchronization system 200 using the quantum entanglement clock synchronization techniques.
Figure 3:
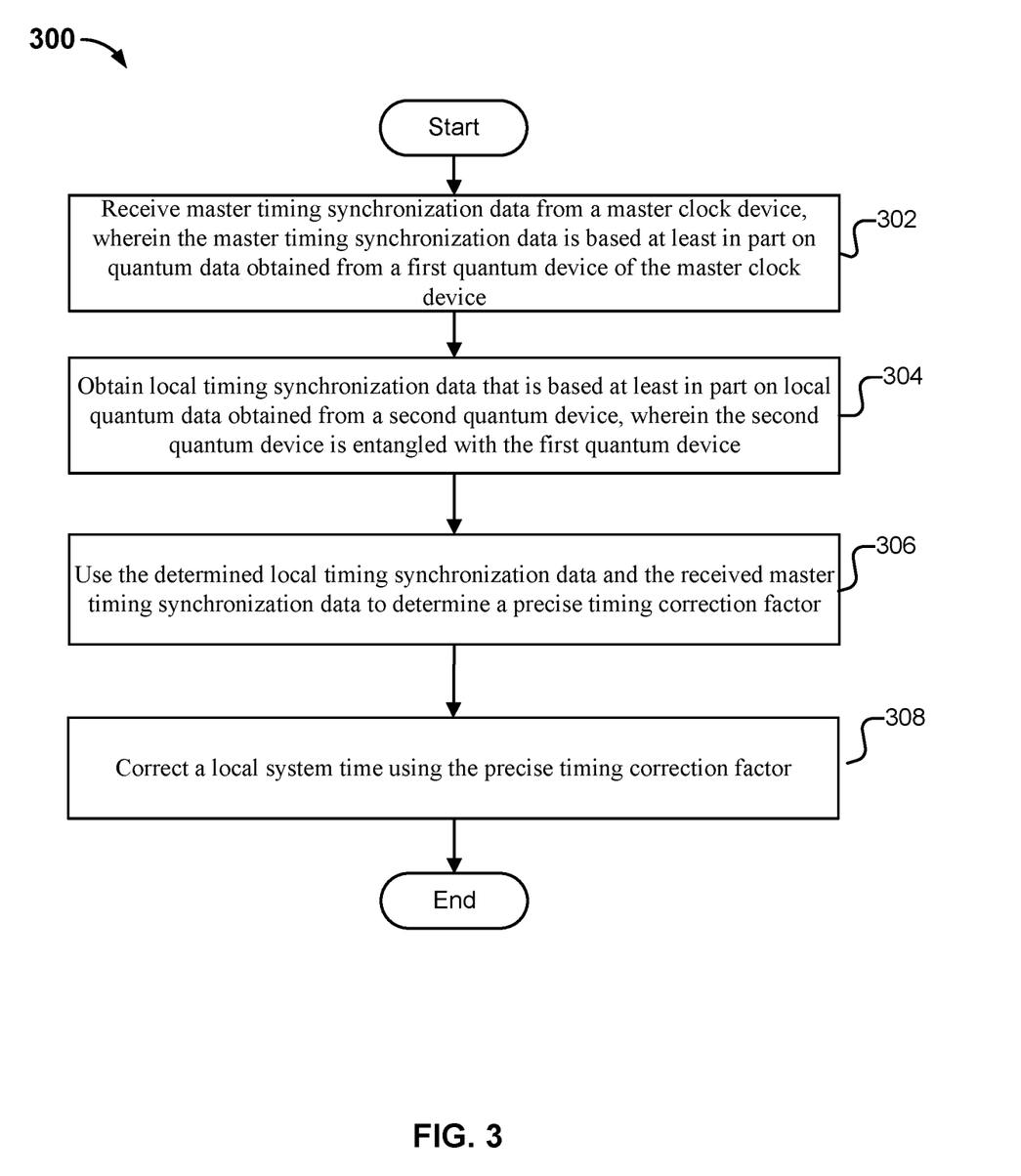
FIG. 3 is a flow chart illustrating an embodiment of a process 300 for a network clock synchronization system with the quantum entanglement clock synchronization techniques.

FIG. 2 illustrates an embodiment of a network clock synchronization system 200 using the quantum entanglement clock synchronization techniques. FIG. 3 is a flow chart illustrating an embodiment of a process 300 for a network clock synchronization system with the quantum entanglement clock synchronization techniques. In some embodiments, process 300 is performed by a clock device of FIG. 2 that acts as a non-master clock device.

With reference to FIG. 2, system 200 includes a master clock device 202 and a non-master clock device 204. Master clock device 202 serves as a master clock against which other non-master clock devices (including non-master clock device 204) are synchronized. Master clock device 202 may be referred to as a grandmaster, time provider, or another similar term. Master clock device 202 may include a local clock 208 that is of higher quality and more accurate than other non-master clock devices, such as an atomic clock. Master clock device 202 may be selected based on a master clock selection algorithm (e.g., best master clock algorithm). Non-master clock device 204 can be an ordinary clock (a non-master clock with a single network connection, also referred to as a slave), a boundary clock (a clock with multiple network connections that can synchronize one network segment to another), or a transparent clock (a clock that modifies messages passing through and can measure and adjust for network delays).

A NIC 234 of master clock device 202 is connected to a NIC 236 of non-master clock device 204 through a network 206. Network 206 may be any combination of public or private networks, including intranets, local area networks (LANs), wide area networks (WANs), radio access networks (RANs), Wi-Fi networks, the Internet, and the like. Master clock device 202 is also connected to non-master clock device 204 via a fiber link 216, as will be described below.

In some embodiments, the improved quantum entanglement clock synchronization techniques disclosed herein may be used to provide a fine calibration of non-master clock device 204 based on master clock device 202. For example, in some embodiments, during a first stage, a traditional technique for synchronizing clocks through network 206 may be used to provide a coarse calibration that achieves a first level of clock accuracy within the network. During a second stage, the synchronization of the clocks is then further fine-tuned using the present improved techniques to achieve an improved level of clock accuracy. For example, the Network Time Protocol (NTP) and the Precision Time Protocol (PTP) may be used to synchronize a local clock 210 of non-master clock device 204 with local clock 208 of master clock device 202 through network 206 to achieve a first level of clock accuracy. Clocks 208 and 210 may be physical hardware clocks (PHCs).

With reference to FIG. 3, at step 302, master timing synchronization data from master clock device 202 is received by non-master clock device 204, wherein the master timing synchronization data is based at least in part on quantum data obtained from a first quantum device of master clock device 202.

With reference to FIG. 2, master clock device 202 includes a master quantum device 212 and non-master clock device 204 includes a non-master quantum device 214. Master quantum device 212 and non-master quantum device 214 use quantum mechanical effects for their operation. Master quantum device 212 and non-master quantum device 214 form a pair of quantum systems in a quantum entangled state. With quantum entanglement, the two devices are linked together such that no matter how far apart they are in space, their state remains the same. In particular, master quantum device 212 is entangled with non-master quantum device 214, such that the quantum data at master quantum device 212 and the quantum data at non-master quantum device 214 is identical at the same time. Each of the two sets of quantum data is a sequence of random values of zeros and ones, and the sequences occur on each side exactly and simultaneously. The two sequences are exact mirror images of each other that occur simultaneously in real time. The entanglement enables the improved techniques to exactly synchronize master clock device 202 and non-master clock device 204 in time.

In some embodiments, master quantum device 212 includes a laser 212A, a filter 212B, a piezoelectric fiber stretcher 212C, an unbalanced interferometer 212D with Faraday mirrors 212E, an intensity modulator 212F, a dispersion compensating fiber 212G, and a variable attenuator 212H. Master quantum device 212 is also connected to non-master quantum device 214 via a fiber link 216, such as an ultralow-loss (ULL) single-mode fiber link.

In some embodiments, laser 212A in master quantum device 212 is a phase-randomized diode laser pulsed at a certain frequency. Phase randomness may be achieved by switching the current completely off between the pulses. The pulses then pass through unbalanced Michelson interferometer 212D. Piezoelectric fiber stretcher 212C on one of the arms of unbalanced Michelson interferometer 212D may be used to adjust the phase. The different qubit states are then encoded by intensity modulator 212F. The qubit states and the pulse energies (signal or decoy state) are chosen at random. Non-master quantum device 214 includes a beam splitter 214A, a plurality of superconducting nanowire single-photon detectors (SNSPDs) 214B, and an unbalanced interferometer 214C with Faraday mirrors 214D.

The synchronization of master clock device 202 and non-master clock device 204 is based at least in part on the output quantum data from master quantum device 212, which is in exact synchronization with the quantum data from non-master quantum device 214.

A phase offset generator 222 is used to generate a signal based on local clock 208. The signal generated by phase offset generator 222 is used as an input to a physics chamber 218 to generate an output that is compared with the output quantum data from master quantum device 212 based on a phase offset detector 226. Phase offset generator 222 is controlled by a control unit 230 to tune its output signal and in turn the generated output of physics chamber 218, such that the generated output of physics chamber 218 is constructive with the output quantum data from master quantum device 212 based on phase offset detector 226. Phase offset detector 226 receives the generated output of physics chamber 218 and the output quantum data from master quantum device 212 and detects the phase offset between the two. When the generated output of physics chamber 218 is constructive with the output quantum data from master quantum device 212 based on phase offset detector 226, their phases match and the phase offset is at the minimum, whereas when the generated output of physics chamber 218 is destructive with the output quantum data from master quantum device 212 based on phase offset detector 226, the two are off-phase and the phase offset is at the maximum. Control unit 230 receives the detected phase offset generated by phase offset detector 226 as an input and determines a corresponding control signal sent to phase offset generator 222 in response to the input, such that the detected phase offset is reduced to a minimum. The resulting signal generated by phase offset generator 222 indicates the phase offset of clock 208 with respect to the output quantum data from master quantum device 212, which may be used by non-master clock device 204 for adjusting its local clock. Therefore, the resulting signal generated by phase offset generator 222 or its corresponding control signal may be sent as master timing synchronization data from master clock device 202 to non-master clock device 204 for adjusting its local clock. In particular, the master timing synchronization data is sent by control unit 230 through NIC 234 and network 206. The master timing synchronization data is then received by a control unit 232 of non-master clock device 204 via NIC 236.

With reference to FIG. 3, at step 304, local timing synchronization data that is based at least in part on local quantum data obtained from a second local quantum device is determined, wherein the second local quantum device is quantumly entangled with the first quantum device such that the local quantum data and the quantum data obtained from the first quantum device are identical at a same time. The second quantum device is non-master quantum device 214, which is quantumly entangled with master quantum device 212.

The synchronization of master clock device 202 and non-master clock device 204 is based at least in part on the output quantum data from non-master quantum device 214, which is in exact synchronization with the quantum data from master quantum device 212.

A phase offset generator 224 is used to generate a signal based on local clock 210. The signal generated by phase offset generator 224 is used as an input to a physics chamber 220 to generate an output that is compared with the output quantum data from non-master quantum device 214 based on a phase offset detector 228. Phase offset generator 224 is controlled by a control unit 232 to tune its output signal and in turn the generated output of physics chamber 220, such that the generated output of physics chamber 220 is constructive with the output quantum data from non-master quantum device 214 based on phase offset detector 228. Phase offset detector 228 receives the generated output of physics chamber 220 and the output quantum data from non-master quantum device 214 and detects the phase offset between the two. When the generated output of physics chamber 220 is constructive with the output quantum data from non-master quantum device 214 based on phase offset detector 228, their phases match and the phase offset is at the minimum, whereas when the generated output of physics chamber 220 is destructive with the output quantum data from non-master quantum device 214 based on phase offset detector 228, the two are off-phase and the phase offset is at the maximum. Control unit 232 receives the detected phase offset generated by phase offset detector 228 as an input and determines a corresponding control signal sent to phase offset generator 224 in response to the input, such that the detected phase offset is reduced to a minimum. The resulting signal generated by phase offset generator 224 indicates the phase offset of clock 210 with respect to the output quantum data from non-master quantum device 214, which may be used by non-master clock device 204 for adjusting its local clock. Therefore, the resulting signal generated by phase offset generator 224 or its corresponding control signal may be determined as local timing synchronization data for adjusting the local clock 210. In particular, the local timing synchronization data is determined by control unit 232.

With reference to FIG. 3, at step 306, the determined local timing synchronization data and the received master timing synchronization data are used by control unit 232 to determine a timing correction factor. For example, a phase offset value corresponding to clock 208 may be determined based on the received master timing synchronization data, and a phase offset value corresponding to clock 210 may be determined based on the determined local timing synchronization data, and the two phase offset values may be used as a timing correction factor to adjust clock 210.

At 308, the local system time is corrected using the timing correction factor. The local current time of clock 210 of non-master clock device 204 is now synchronized with the master current time of clock 208 of master clock device 202. In some embodiments, the local system time was corrected using an initial timing correction factor determined using a network-based time correction protocol prior to the correction using the timing correction factor. For example, the network-based time correction protocol is the Network Time Protocol (NTP) or the Precision Time Protocol (PTP).

Figure 4:
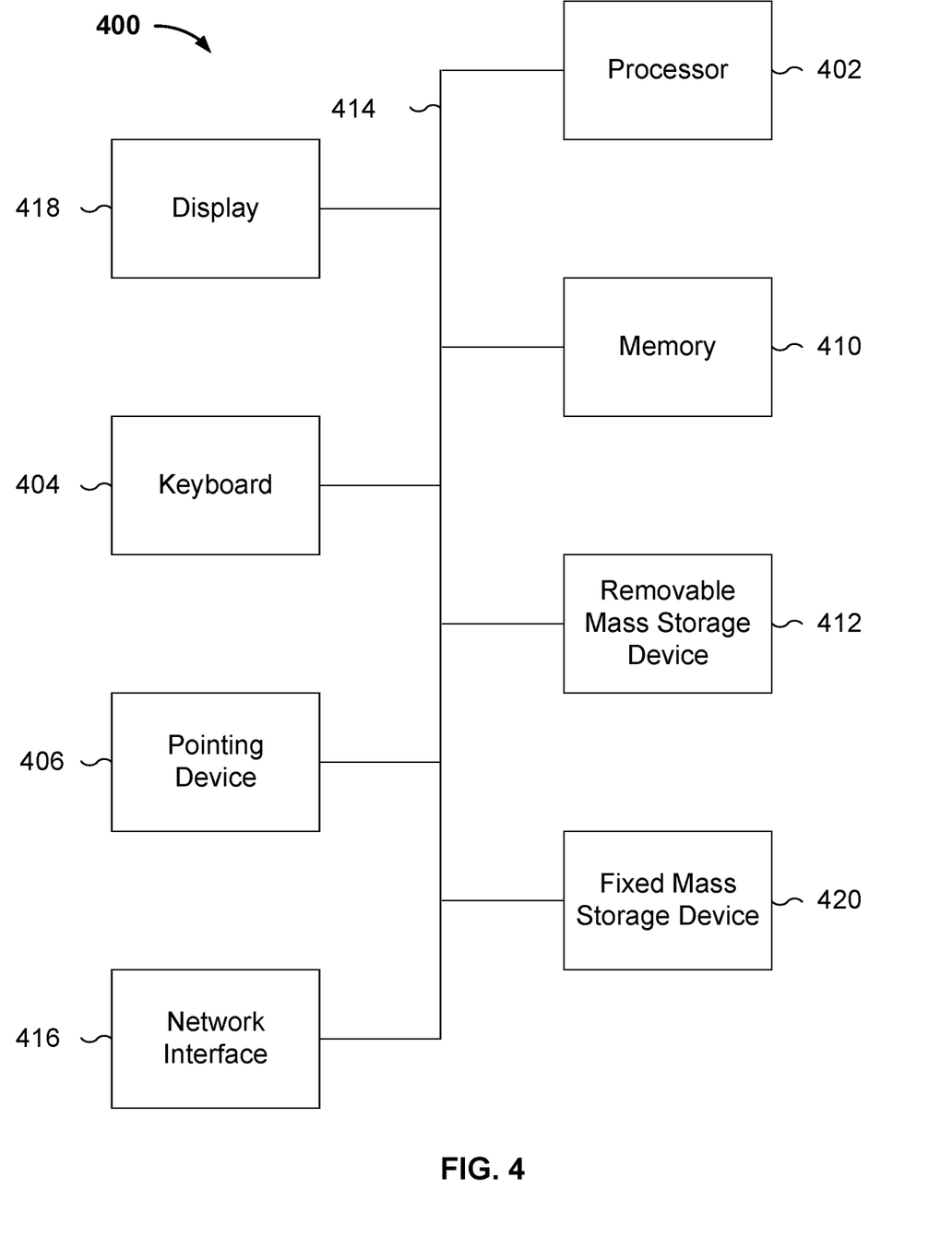
FIG. 4 is a functional diagram illustrating a programmed computer system for executing some of the processes herein in accordance with some embodiments.

FIG. 4 is a functional diagram illustrating a programmed computer system for executing some of the processes herein in accordance with some embodiments. As will be apparent, other computer system architectures and configurations can be used as well. Computer system 400, which includes various subsystems as described below, includes at least one microprocessor subsystem (also referred to as a processor or a central processing unit (CPU)) 402. For example, processor 402 can be implemented by a single-chip processor or by multiple processors. In some embodiments, processor 402 is a general purpose digital processor that controls the operation of the computer system 400. Using instructions retrieved from memory 410, the processor 402 controls the reception and manipulation of input data, and the output and display of data on output devices (e.g., display 418). In some embodiments, processor 402 includes and/or is used to execute/perform process 300 described above with respect to FIG. 3.

Processor 402 is coupled bi-directionally with memory 410, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 402. Also as is well known in the art, primary storage typically includes basic operating instructions, program code, data and objects used by the processor 402 to perform its functions (e.g., programmed instructions). For example, memory 410 can include any suitable computer-readable storage media, described below, depending on whether, for example, data access needs to be bi-directional or uni-directional. For example, processor 402 can also directly and very rapidly retrieve and store frequently needed data in a cache memory (not shown).

A removable mass storage device 412 provides additional data storage capacity for the computer system 400, and is coupled either bi-directionally (read/write) or uni-directionally (read only) to processor 402. For example, storage 412 can also include computer-readable media such as magnetic tape, flash memory, PC-CARDS, portable mass storage devices, holographic storage devices, and other storage devices. A fixed mass storage 420 can also, for example, provide additional data storage capacity. The most common example of mass storage 420 is a hard disk drive. Mass storages 412, 420 generally store additional programming instructions, data, and the like that typically are not in active use by the processor 402. It will be appreciated that the information retained within mass storages 412 and 420 can be incorporated, if needed, in standard fashion as part of memory 410 (e.g., RAM) as virtual memory.

In addition to providing processor 402 access to storage subsystems, bus 414 can also be used to provide access to other subsystems and devices. As shown, these can include a display monitor 418, a network interface 416, a keyboard 404, and a pointing device 406, as well as an auxiliary input/output device interface, a sound card, speakers, and other subsystems as needed. For example, the pointing device 406 can be a mouse, stylus, track ball, or tablet, and is useful for interacting with a graphical user interface.

The network interface 416 allows processor 402 to be coupled to another computer, computer network, or telecommunications network using a network connection as shown. For example, through the network interface 416, the processor 402 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 402 can be used to connect the computer system 400 to an external network and transfer data according to standard protocols. For example, various process embodiments disclosed herein can be executed on processor 402, or can be performed across a network such as the Internet, intranet networks, or local area networks, in conjunction with a remote processor that shares a portion of the processing. Additional mass storage devices (not shown) can also be connected to processor 402 through network interface 416.

An auxiliary I/O device interface (not shown) can be used in conjunction with computer system 400. The auxiliary I/O device interface can include general and customized interfaces that allow the processor 402 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 4 is but an example of a computer system suitable for use with the various embodiments disclosed herein. Other computer systems suitable for such use can include additional or fewer subsystems. In addition, bus 414 is illustrative of any interconnection scheme serving to link the subsystems. Other computer architectures having different configurations of subsystems can also be utilized.

Although the foregoing embodiments have been described in some detail for purposes of clarity of understanding, the disclosure is not limited to the details provided. There are many alternative ways of implementing the disclosure. The disclosed embodiments are illustrative and not restrictive.

What is claimed is:

1. A system, comprising:
a communication interface configured to receive master timing synchronization data from a master clock device, wherein the master timing synchronization data is based at least in part on quantum data obtained from a first quantum device of the master clock device; and
one or more processors configured to:
determine local timing synchronization data that is based at least in part on local quantum data obtained from a second local quantum device, wherein the second local quantum device is entangled with the first quantum device;

use the determined local timing synchronization data and the received master timing synchronization data to determine a timing correction factor; and correct a local system time using the timing correction factor.

2. The system of claim 1, wherein the local quantum data and the quantum data obtained from the first quantum device are identical at a same time.

3. The system of claim 1, wherein the local system time was corrected using an initial timing correction factor determined using a network-based time correction protocol prior to the correction using the timing correction factor.

4. The system of claim 1, wherein the master clock device comprises:
a first physics chamber;
a first phase offset generator configured to generate a signal as an input to the first physics chamber; and
one or more processors of the master clock device configured to:
tune the signal generated by the first phase offset generator with a first control signal, such that an output of the first physics chamber is constructive with the quantum data obtained from the first quantum device of the master clock device.

5. The system of claim 4, wherein the master clock device further comprises:
a first phase offset detector, wherein the first phase offset detector is configured to receive the output of the first physics chamber and the quantum data obtained from the first quantum device of the master clock device and detect a first phase offset between the output of the first physics chamber and the quantum data obtained from the first quantum device of the master clock device.

6. The system of claim 5, wherein the one or more processors of the master clock device are configured to tune the signal generated by the first phase offset generator in response to the detected first phase offset between the output of the first physics chamber and the quantum data obtained from the first quantum device of the master clock device.

7. The system of claim 4, wherein the master timing synchronization data from the master clock device comprises the signal generated as the input to the first physics chamber or the first control signal.

8. The system of claim 1, further comprising:
a second physics chamber; and
a second phase offset generator configured to generate a signal as an input to the second physics chamber,
wherein the one or more processors are configured to:
tune the signal generated by the second phase offset generator with a second control signal, such that an output of the second physics chamber is constructive with the local quantum data obtained from the second local quantum device.

9. The system of claim 8, further comprising:
a second phase offset detector, wherein the second phase offset detector is configured to receive the output of the second physics chamber and the local quantum data obtained from the second local quantum device and detect a second phase offset between the output of the second physics chamber and the local quantum data obtained from the second local quantum device.

10. The system of claim 9, wherein the one or more processors are configured to tune the signal generated by the second phase offset generator in response to the detected second phase offset between the output of the second physics chamber and the local quantum data obtained from the second local quantum device.

11. The system of claim 8, wherein the local timing synchronization data comprises the signal generated as the input to the second physics chamber or the second control signal.

12. A system, comprising:
one or more processors configured to:
determine master timing synchronization data that is based at least in part on quantum data obtained from a first quantum device, wherein the first quantum device is entangled with a second quantum device of a non-master clock device; and
a communication interface configured to:
send the master timing synchronization data to the non-master clock device, wherein the non-master clock device is configured to:
determine non-master timing synchronization data that is based at least in part on quantum data obtained from the second quantum device;
use the determined non-master timing synchronization data and the master timing synchronization data to determine a timing correction factor; and
correct a system time of the non-master clock device using the timing correction factor.

13. The system of claim 12, wherein the quantum data obtained from the first quantum device and the quantum data obtained from the second quantum device are identical at a same time.

14. The system of claim 12, further comprising:
a first physics chamber; and
a first phase offset generator configured to generate a signal as an input to the first physics chamber,
wherein the one or more processors are configured to:
tune the signal generated by the first phase offset generator with a first control signal, such that an output of the first physics chamber is constructive with the quantum data obtained from the first quantum device.

15. The system of claim 14, further comprising:
a first phase offset detector, wherein the first phase offset detector is configured to receive the output of the first physics chamber and the quantum data obtained from the first quantum device and detect a first phase offset between the output of the first physics chamber and the quantum data obtained from the first quantum device; and
wherein the one or more processors are configured to tune the signal generated by the first phase offset generator in response to the detected first phase offset between the output of the first physics chamber and the quantum data obtained from the first quantum device.

16. The system of claim 14, wherein the master timing synchronization data comprises the signal generated as the input to the first physics chamber or the first control signal.

17. A method, comprising:
receiving master timing synchronization data from a master clock device, wherein the master timing synchronization data is based at least in part on quantum data obtained from a first quantum device of the master clock device;
determining local timing synchronization data that is based at least in part on local quantum data obtained from a second local quantum device, wherein the second local quantum device is entangled with the first quantum device;
using the determined local timing synchronization data and the received master timing synchronization data to determine a timing correction factor; and correcting a local system time using the timing correction factor.

18. The method of claim 17, further comprising:
generating a signal as an input to a physics chamber by a phase offset generator; and
tuning the signal generated by the phase offset generator with a control signal, such that an output of the physics chamber is constructive with the quantum data obtained from the first quantum device.

19. The method of claim 18, further comprising:
receiving the output of the physics chamber and the quantum data obtained from the first quantum device by a phase offset detector and detecting a phase offset between the output of the physics chamber and the quantum data obtained from the first quantum device.

20. The method of claim 19, further comprising:
tuning the signal generated by the phase offset generator in response to the detected phase offset between the output of the physics chamber and the quantum data obtained from the first quantum device.

* * * * *